(12) United States Patent
Kona

(10) Patent No.: US 9,694,630 B2
(45) Date of Patent: Jul. 4, 2017

(54) METHOD OF DETERMINING TIRE PRESSURE

(71) Applicant: DANA HEAVY VEHICLE SYSTEMS GROUP, LLC, Maumee, OH (US)

(72) Inventor: Venkata Ramakanth Kona, Maumee, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 14/392,409

(22) PCT Filed: Dec. 1, 2014

(86) PCT No.: PCT/US2014/067881
§ 371 (c)(1),
(2) Date: Jun. 6, 2016

(87) PCT Pub. No.: WO2015/084708
PCT Pub. Date: Jun. 11, 2015

(65) Prior Publication Data
US 2016/0375730 A1    Dec. 29, 2016

Related U.S. Application Data

(60) Provisional application No. 61/912,640, filed on Dec. 14, 2014.

(51) Int. Cl.
*B60C 23/00* (2006.01)
*B60C 23/04* (2006.01)
*B60C 29/02* (2006.01)

(52) U.S. Cl.
CPC ............ *B60C 23/003* (2013.01); *B60C 23/04* (2013.01); *B60C 29/02* (2013.01)

(58) Field of Classification Search
CPC ........ B60C 23/003; B60C 23/04; B60C 29/02
(Continued)

(56) References Cited

U.S. PATENT DOCUMENTS 4,898,216 A    2/1990  Schultz et al.
5,180,456 A *  1/1993  Schultz ................. B60C 23/003
                                                    141/1
(Continued)

FOREIGN PATENT DOCUMENTS

GB    2262921 A    7/1993

OTHER PUBLICATIONS

European Patent Office, The International Search Report and the Written Opinion of the International Searching Authority, issued in PCT/US2014/067881, Feb. 10, 2015, 9 pages, European Patent Office, Rijswijk, Netherlands.

*Primary Examiner* — Timothy L Maust
(74) *Attorney, Agent, or Firm* — Marshall & Melhorn, LLC (57) ABSTRACT

A method of determining tire pressure includes providing a control unit which comprises a pressure sensor. The control unit is in fluid communication with a wheel valve via a fluid control circuit. A pressure of air in the fluid control circuit is measured utilizing the pressure sensor. The method also includes determining whether a leak is present in a fluid control circuit and providing a leakage compensation pressure. The tire pressure is calculated by adding the pressure of the air in the fluid control circuit and the leakage compensation pressure together.

17 Claims, 3 Drawing Sheets

(58) Field of Classification Search
USPC .................. 141/38; 73/146, 146.2; 152/415
See application file for complete search history.

(56) References Cited

U.S. PATENT DOCUMENTS

| | | | |
|---|---|---|---|
| 5,309,969 | A | 5/1994 | Mittal |
| 5,313,995 | A | 5/1994 | Schultz |
| 5,524,481 | A | 6/1996 | Claussen et al. |
| 5,540,268 | A | 7/1996 | Mittal |
| 6,561,017 | B1 * | 5/2003 | Claussen ............. B60C 23/0408 73/146 |
| 6,604,414 | B1 | 8/2003 | Claussen et al. |
| 6,666,078 | B1 * | 12/2003 | Claussen ............... B60C 23/003 73/146 |
| 6,758,088 | B2 | 7/2004 | Claussen et al. |
| 6,865,930 | B1 | 3/2005 | Claussen et al. |
| 6,868,358 | B2 * | 3/2005 | Brown, Jr. .......... B60C 23/0408 340/442 |
| 6,868,719 | B1 | 3/2005 | Claussen et al. |
| 6,894,607 | B1 * | 5/2005 | Claussen ............... B60C 23/003 137/225 |
| 7,051,585 | B2 | 5/2006 | Claussen et al. |
| 7,265,659 | B2 | 9/2007 | Claussen et al. |
| 7,538,661 | B2 | 5/2009 | Claussen et al. |
| RE41,756 | E | 9/2010 | Claussen et al. |
| 7,839,274 | B2 | 11/2010 | Isono |
| 8,307,868 | B2 * | 11/2012 | Medley ................. B60C 23/003 152/415 |
| 8,973,633 | B2 * | 3/2015 | Wilson ................. B60C 23/003 152/415 |
| 9,434,216 | B2 * | 9/2016 | Wilson ................. B60C 23/003 |
| 9,493,042 | B2 * | 11/2016 | Gillen .................... F16K 27/12 |
| 2006/0053876 | A1 * | 3/2006 | Claussen ............... B60C 23/003 73/146 |
| 2015/0258863 | A1 | 9/2015 | Gillen |

* cited by examiner

METHOD OF DETERMINING TIRE PRESSURE

CROSS-REFERENCE TO RELATED APPLICATION

This application is claiming the benefit, under 35 U.S.C. 119(e), of the provisional application which was granted Ser. No. 61/912,640 filed on Dec. 6, 2013, the entire disclosure of which is hereby incorporated by reference.

BACKGROUND OF THE INVENTION

The invention relates to a method of determining tire pressure. In particular, the invention relates to a method of determining tire pressure utilizing a tire pressure management system.

Tire pressure management systems such as, for example, central tire inflation systems can be utilized to manually and/or automatically adjust the pressure within a tire. In order to determine when an adjustment is necessary and to avoid over inflation or under inflation, the tire pressure is measured by, for example, a sensor. It is important that the pressure measured is a true reflection of the tire pressure. However, air leakage unrelated to the tire which is from, for example, a fluid conduit may cause inaccuracy in the pressure measured such that the actual tire pressure is not provided.

Therefore, it would be advantageous to develop a method that accounts for leakage and accurately determines the tire pressure.

BRIEF SUMMARY OF THE INVENTION

Embodiments of a method of determining tire pressure are provided.

In an embodiment, the method of determining tire pressure comprises providing a control unit. The control unit comprises a pressure sensor. The control unit is in fluid communication with a wheel valve via a fluid control circuit. A pressure of air in the fluid control circuit is measured utilizing the pressure sensor. It is determined whether a leak is present in a fluid control circuit and a leakage compensation pressure is provided. A tire pressure is calculated by adding the pressure of the air in the fluid control circuit and the leakage compensation pressure together.

In another embodiment, the method of determining tire pressure comprises providing a control unit. The control unit comprises a pressure sensor. The control unit is in fluid communication with a check valve via a fluid control circuit. An air supply is provided in fluid communication with the control unit and air from the air supply is introduced into the fluid control circuit via two or more pulses. A pressure of the air in the fluid control circuit is measured utilizing the pressure sensor. It is determined whether a leak is present in a fluid control circuit by measuring the pressure of the air in the fluid control circuit over a predetermined period of time in order to detect a decrease in the pressure. A rate by which the pressure of the air in the fluid control circuit decreases is determined to provide a leakage compensation pressure. A tire pressure is calculated by adding the pressure of the air in the fluid control circuit and the leakage compensation pressure together.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific assemblies, devices, systems and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Embodiments of a method of determining tire pressure are described below. The method may be utilized with a tire pressure management system for a vehicle (not depicted). Preferably, the method is utilized with a central tire inflation system (CTIS) for a commercial vehicle. The method described herein may have applications in tire pressure management systems which are inflate and maintain only or are systems with both inflate and deflate capability.

Figure 1:
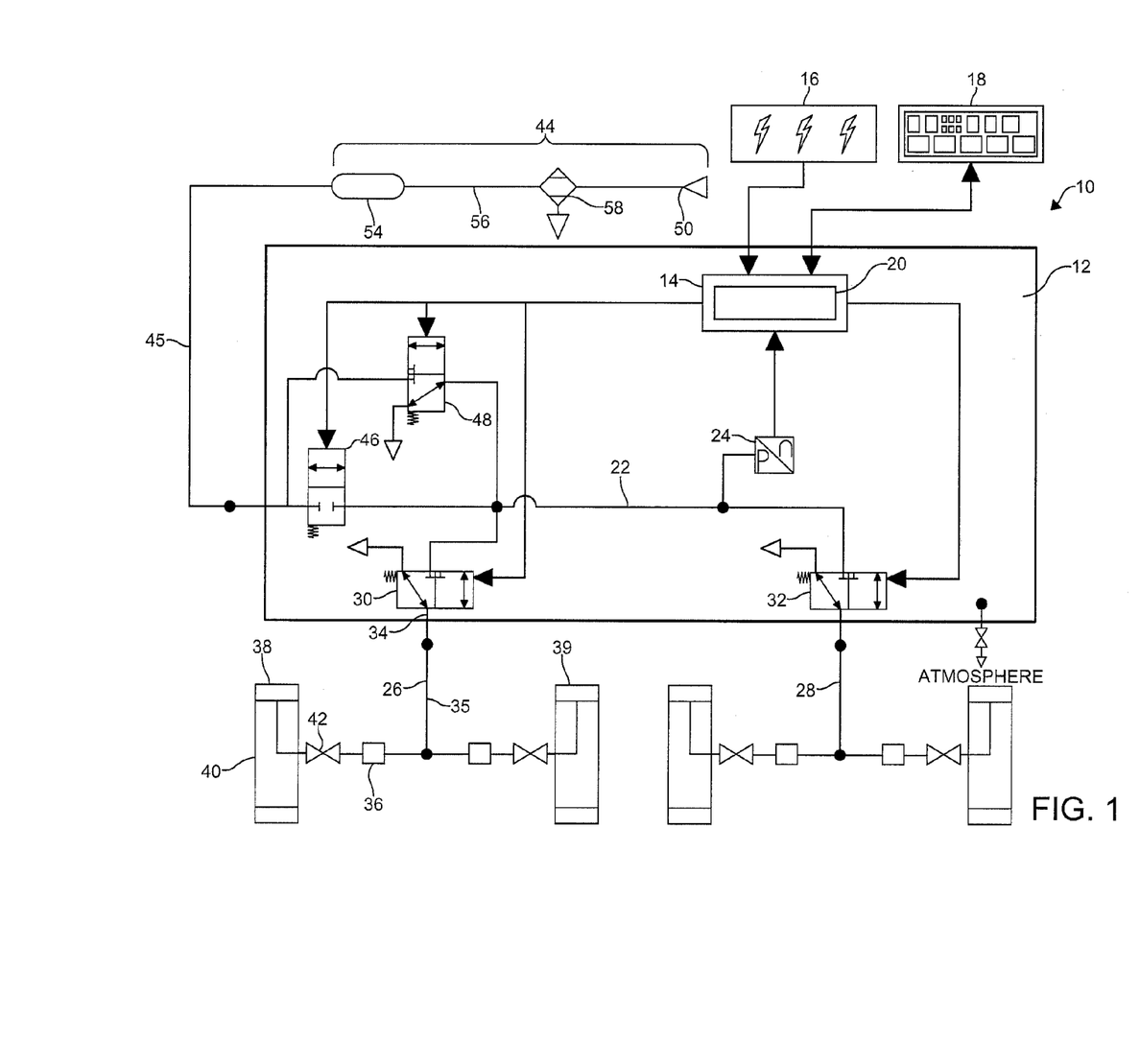
FIG. 1 depicts a schematic view of an embodiment of a tire pressure management system in accordance with the invention.

A schematic illustration of an embodiment of a tire pressure management system 10 suitable for use in practicing the method is illustrated in FIG. 1. Additional embodiments of tire pressure management systems suitable for use in practicing the method are described in U.S. Pat. Nos. 4,898,216, 5,524,481, 5,313,995, 6,604,414, 6,758,088, 7,538,661 and RE41,756, the entire disclosures of which are hereby incorporated by reference. It should be appreciated that tire pressure management systems beyond those above-listed could also be utilized in practicing the method described herein.

Additionally, the method described herein may have applications in vehicles for both light and heavy duty and for passenger, commercial, and off-highway vehicles. Furthermore, it would be understood by one of ordinary skill in the art that the method could have industrial, locomotive, military and aerospace applications. Also, it should be appreciated that the method may be practiced prior to or during operation of the vehicle.

The method will be described in connection with a fluid. For the purposes of describing the method, the fluid will hereinafter be referred to as air. However, alternative fluids are capable of being utilized in practicing the method. In an embodiment, the method comprises providing a control unit 12. As illustrated in FIG. 1, the control unit 12 may be provided as a portion of the tire pressure management system 10. Embodiments of a control unit 12 suitable for use in practicing the method are described in U.S. patent application Ser. No. 14/208,467, the entire disclosure of which is hereby incorporated by reference. The control unit 12 comprises a pressure sensor 24 for measuring the pressure of air.

It should be appreciated that the pressure sensor may also be referred to as a pressure transducer. Preferably, the control unit 12 also comprises a plurality of valve assemblies 30, 32, 46, 48, which are of the solenoid variety and described in more detail below, and a first fluid conduit 22 for controlling the flow of and directing air. As shown in FIG. 1, the first fluid conduit 22 is attached to and in fluid communication with the pressure sensor 24 and valve assemblies 30, 32, 46, 48.

An electronic control portion 14 may receive input signals from the pressure sensor 24, a power supply 16 and one or more additional sensors (not depicted) such as, for example, a load sensor and a speed sensor. The electronic control portion 14 may also receive input signals from an operator control device 18. The electronic control portion 14 may include a microprocessor 20 operating under the control of a set of programming instructions, which may also be referred to as software. The electronic control portion 14 may include a memory (not depicted) in which programming instructions are stored. The memory can also store identification codes, tire pressure records and/or user inputs over a period of time.

The electronic control portion 14 outputs signals to the valve assemblies 30, 32, 46, 48. The output signals may be electrical current. Electrical current can be received by a valve assembly 30, 32, 46, 48 to open or close the valve assembly 30, 32, 46, 48. Similarly, electrical current can be removed from a valve assembly 30, 32, 46, 48 to open or close the valve assembly 30, 32, 46, 48. The electronic control portion 16 may also output signals to a display device (not depicted). The display device may be included as a part of the operator control device 18 or a freestanding device.

The control unit 12 is selectively in fluid communication with a fluid control circuit 26. Preferably, fluid communication between the control unit 12 and fluid control circuit 26 is controlled by opening or closing a channel valve assembly 30. The channel valve assembly 30 is preferably of the solenoid variety as mentioned above. For the purposes of describing the method, when the channel valve assembly 30 is open or in an open position, the control unit 12 will be described as being in fluid communication with the fluid control circuit 26. However, when the channel valve assembly 30 is described as being closed or in a closed position, the control unit will be described as not being in fluid communication with the fluid control circuit 26. The fluid control circuit comprises 26 one or more fluid conduits 34, 35. The fluid control circuit 26 may also comprise a rotary seal assembly 36 and a hose assembly (not depicted).

The method will be described with reference to one fluid control circuit 26. However, it should be appreciated that the control unit 12 may selectively communicate with a plurality of fluid control circuits 26, 28. For example, a first fluid control circuit 26 associated with a drive axle of the vehicle could be provided and a second fluid control circuit 28 associated with a steer axle of the vehicle could be provided in practicing the method. Preferably, the first fluid control circuit 26 and the second fluid control circuit 28 are similarly configured. Fluid communication between the control unit 12 and second fluid control circuit 28 is controlled by opening or closing a second channel valve assembly 32. When the control unit 12 is in fluid communication with a fluid control circuit 26, 28, the pressure sensor measures the pressure of the air in the fluid control circuit 26, 28 via the first fluid conduit 22.

The fluid control circuit 26 is utilized to provide fluid communication between one or more tires 38, 39 and the control unit 12. Each tire 38, 39 contains air at a certain pressure which will hereinafter be referred to as tire pressure. The method will be described below with reference to determining the tire pressure of one tire 38. However, the control unit 12 may at certain times be in fluid communication with a plurality of tires or exactly one tire via the fluid control circuit 26. Thus, in certain embodiments, the method may be utilized to determine the tire pressure of a plurality of tires 38, 39.

Preferably, the tire pressure is equal to a target tire pressure. The target tire pressure can be selected to be a desired pressure. After the target tire pressure is selected, it is programmed into the electronic control portion 14. If it is determined that the tire pressure is less than the target tire pressure, the tire pressure can be increased. If it is determined that the tire pressure is greater than the target tire pressure, the tire pressure can be decreased. Also, in certain embodiments, the tire pressure may not be known at the time of practicing the method and, in other embodiments, the tire pressure may have been measured recently and may be approximately known at the time of practicing the method.

The tire 38 is provided on a wheel assembly 40 which has a wheel valve 42 affixed thereto. The fluid control circuit 26 is in fluid communication with the tire 38 via the wheel valve 42. The fluid control circuit 26 ends at the wheel valve 42. The wheel valve 42 separates the fluid control circuit 26 from the tire 38 and is utilized to retain air within the tire. The wheel valve 42 allows the tire 38 to selectively communicate with the control unit 12 via the fluid control circuit 26. Preferably, the wheel valve 42 is of the check valve variety.

The control unit 12 also selectively communicates with an air supply 44 via an air supply circuit 45. When the control unit 12 is in fluid communication with the air supply 44 and the channel valve assemblies 30, 32 are in a closed position, the pressure sensor 24 measures the pressure of the air supply 44 via the air supply circuit 45 and the first fluid conduit 22. To measure the pressure of the air supply, a supply valve assembly 46 is placed in an open position. The control unit 12 also preferably comprises a control valve assembly 48 which provides a certain amount of fluid communication between the air supply 44 and fluid control circuit 26 via the control unit 12. The control valve assembly 48 is provided with an orifice which is smaller than the orifice of the supply valve assembly 46 and is utilized to provide a bleed of air from the air supply 44 to the fluid control circuit 26. Preferably, the supply valve assembly 46 and control valve assembly 48 are of the solenoid variety as mentioned above.

The air supply 44 is utilized to determine the tire pressure and, if needed, open the wheel valve 42 and increase the pressure of the air within the tire 38. The air supply 44 is preferably provided by an air compressor 50 attached to the vehicle. Preferably, the air supply 52 also comprises a reservoir 54 such as, for example, a wet tank. The compressor 50 is in fluid communication with the reservoir 54 via a supply conduit 56. The air compressor 50 supplies pressurized air to the reservoir 54 for storage therein. Pressurized air from the air supply 44 is provided to the air supply circuit 45 via the reservoir 54. In certain embodiments, a drier 58 is provided for removing water from the air supply 44. A filter (not depicted) may also be interposed in the air supply circuit 45 or the supply conduit 56.

The air supply 44 comprises air at a certain pressure which, at the time of practicing the method described herein, has been measured and determined to be greater than the tire pressure. Preferably, the pressure of the air in the air supply 44 is equal to or greater than the target tire pressure so that the tire pressure can, if needed, be increased to the target tire pressure. In an embodiment, the pressure of the air in the air supply 44 is equal to the target tire pressure plus 5 psig or more.

The control unit 12 is configured to determine the tire pressure and, if needed, urge the wheel valve 42 to an open position to increase the tire pressure. To initiate opening the wheel valve 42, the channel valve assembly 30, supply valve assembly 46 and control valve assembly 48 are placed in an open position so that the air supply 44 is in fluid communication with the wheel valve 42 via the first fluid conduit 22 and fluid control circuit 26. Once the air supply 44 is in fluid communication with the wheel valve 42, the air supply 44 is maintained in fluid communication with the wheel valve 42 for a predetermined time to urge the wheel valve 42 to an open position. The wheel valve 42 is urged to the open position due to the pressure difference between the air supply 44 and the tire pressure. Once open, the wheel valve 42 can be maintained in an open position for a predetermined period of time to increase the tire pressure to the target tire pressure. The wheel valve 42 can be maintained in an open position utilizing the bleed air. The wheel valve 42 may also be urged to a closed position when desired such as, for example, when the tire pressure has been increased to the target tire pressure.

Preferably, the method comprises calculating the tire pressure. The tire pressure is calculated by measuring the pressure of the air in the fluid control circuit 26 and, if it is determined that a leak is present therein, adjusting the pressure measured by a leakage compensation pressure. In certain embodiments, the leakage compensation pressure may be negligible or equal to zero such as, for example, when it is determined that there are no leaks in the fluid control circuit 26. In these embodiments, the tire pressure may be equal to the pressure of the air measured in the fluid control circuit 26.

To calculate the tire pressure, air from the air supply 44 is introduced into the fluid control circuit 26 and the pressure of the air in the fluid control circuit 26 is measured utilizing the pressure sensor 24 as described above. Prior to introducing air from the air supply 44 into the fluid control circuit 26, the pressure of the air supply 44 is measured utilizing the pressure sensor 24 as described above to determine if it is greater than the target tire pressure. Once it is determined that the pressure of the air supply 44 is greater than the target tire pressure, air is introduced into the fluid control circuit 26 from the air supply 44 via two or more pulses. Each pulse comprises air from the air supply 44 and is provided for a predetermined period of time. As pulses of air are introduced into the fluid control circuit 26, the pressure of the air therein increases.

A pulse of air is provided by placing the air supply 44 in fluid communication with the fluid control circuit 26 by placing each of the channel valve assembly 30, supply valve assembly 46 and control valve assembly 48 in an open position for a first predetermined period of time and, at the end of the first predetermined period of time, placing the supply valve assembly 46 in a closed position. Preferably, the supply valve assembly remains in the closed position for a second predetermined period of time. During this period of time, the pressure of the air in the fluid control circuit 26 settles and is measured by the pressure sensor 24. After measuring the pressure of the air, one or more subsequent pulses of air may be introduced into the fluid control circuit 26 as described above. The duration of the pulses utilized to calculate the tire pressure may vary between embodiments of the method. Also, it is preferred that the duration of subsequent pulses decreases as the pressure in the fluid control circuit 26 approaches the target pressure.

The pressure measured and utilized in calculating the tire pressure is the pressure of the air in the fluid control circuit 26 when it is determined that this pressure is close or equal to the tire pressure. The pressure of the air in the fluid control circuit 26 determined to be close or equal to the tire pressure provides a measured tire pressure. To determine if the pressure is close or equal to the tire pressure, the difference between the pressure of the air in the fluid control circuit 26 after consecutive pulses is determined. As the pressure of the air in the fluid control circuit 26 approaches the tire pressure, the difference in pressure after consecutive pulses will decrease. When the difference in the pressure of the air in the fluid control circuit 26 between consecutive pulses is within a predefined value, the pressure of the air in the fluid control circuit 26 is determined to be close or equal to the tire pressure. After it is determined that the pressure of the air in the fluid control circuit 26 is close or equal to the tire pressure and a predetermined period of time, the pressure of the air in the fluid control circuit 26 is measured for use in calculating the tire pressure.

After the pressure of the air in the fluid control circuit 26 is measured for use in calculating the tire pressure, it is determined if a leak is present in the fluid control circuit 26. To determine if a leak is present in the fluid control circuit 26, the change in pressure of the air in the fluid control circuit 26 is measured over time and monitored utilizing the pressure sensor 24. Preferably, the change in pressure of the air in the fluid control circuit 26 is measured and detected when the wheel valve 42 is in a closed position. If, after the pressure of the air in the fluid control circuit 26 is determined to be close or equal to the tire pressure, a decrease in the pressure of the air in the fluid control circuit 26 is measured despite bleed air being directed into the fluid control circuit 26, then it is determined that a leak is present in the fluid control circuit 26. This determinative measurement can be attributed to the wheel valve 42 being urged to a closed position once the pressure of the air in the fluid control circuit 26 settles and drops below the tire pressure. Preferably, if a leak is present in the fluid control circuit 26, the decrease in the pressure of the air in the fluid control circuit 26 is continuously detected for a predetermined period of time.

After it is determined if a leak is present in the fluid control circuit 26, a leakage compensation pressure is calculated and provided to be utilized in calculating the tire pressure. The leakage compensation pressure is utilized to correct for a low value for the measured tire pressure due to air leaking from the fluid control circuit 26 to atmosphere. The leakage compensation pressure is a function of the rate by which air leaks from the fluid control circuit 26. The rate by which air leaks from the fluid control circuit 26 is determined by measuring the decrease in pressure of the air in the fluid control circuit 26 over a predetermined period of time utilizing the pressure sensor 24. In an embodiment, the leakage compensation pressure is calculated by measuring the pressure or the air in the fluid control circuit 26 at three or more predetermined periods of time and the pressure measured at each of the three or more predetermined periods of time is recorded to calculate the leakage compensation pressure. Preferably, the difference in pressure between a first pressure measurement, which is equal to the measured tire pressure, and a successive second pressure measurement is calculated and then added to the difference between the aforementioned change in pressure and the difference in pressure between the second pressure measurement and a successive third pressure measurement to calculate the leakage compensation pressure. As noted above, when a leak is not present in the fluid control circuit 26 the leakage compensation pressure is calculated to be equal to zero. Also, when a leak is not present in the fluid control circuit 26, the pressure of the air in the fluid control circuit 26 will slowly increase due to bleed air being directed into the fluid control circuit 26.

Once the pressure of the air in the fluid control circuit 26 has been measured as above-described and the leakage compensation pressure has been calculated, the tire pressure can be calculated by adding the leakage compensation pressure and the pressure measured together. Thus, the method improves the functionality of a tire pressure management system by accurately determining tire pressure even when air is leaking from, for example, a fluid conduit, rotary seal assembly, hose assembly and/or another portion of a fluid control circuit. In certain embodiments and prior to calculating the tire pressure, the pressure of the air supply 44 is re-measured to determine if the pressure of the air provided by the air supply 44 dropped in order to ensure that a drop in the pressure of the air provided by the air supply did not result in an inaccurate leakage compensation pressure. If the pressure of the air provided by the air supply 44 has not dropped, the leakage compensation pressure is confirmed and utilized in calculating the tire pressure.

The steps of measuring the pressure of the air supply 44, introducing pulses of air into fluid control circuit 26, measuring the pressure of the air in the fluid control circuit 26, determining if a leak is present in fluid control circuit 26, providing a leakage compensation pressure and calculating the tire pressure can be repeated as desired.

Figure 2:
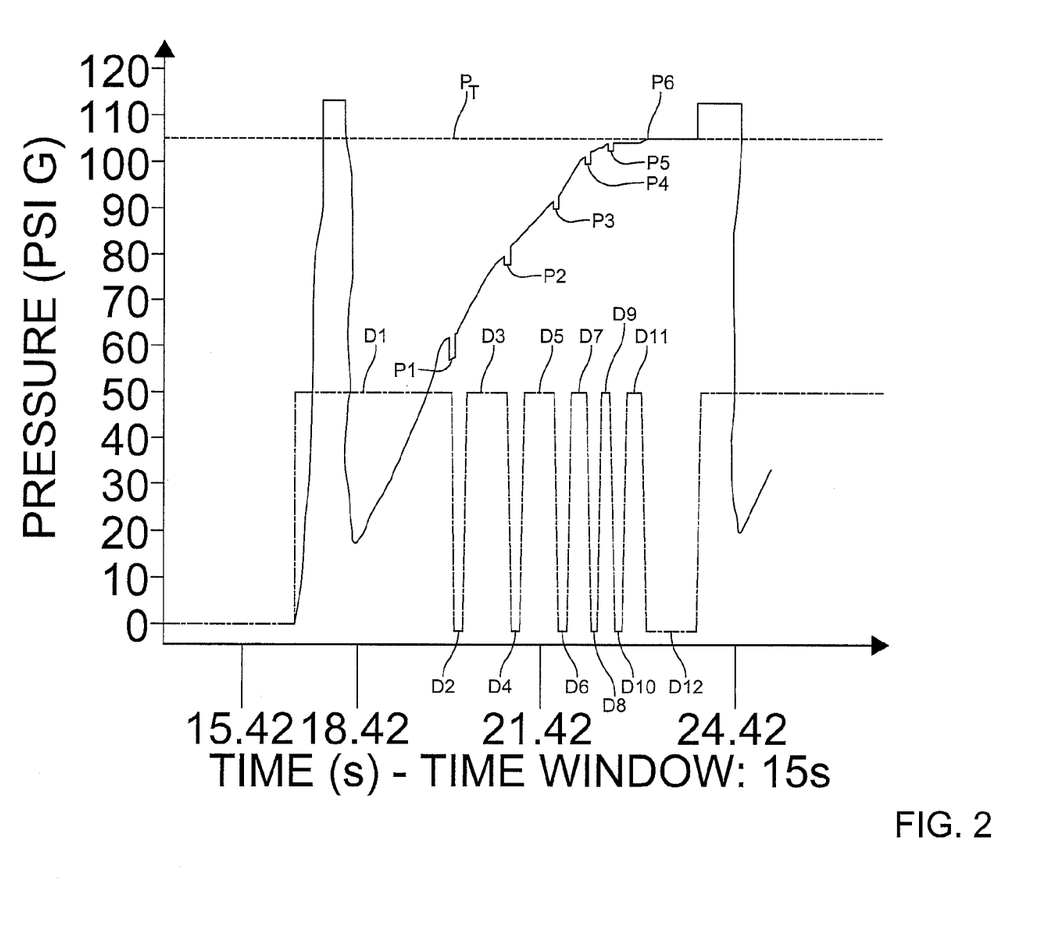
FIG. 2 depicts a graphical view of an embodiment of a method of measuring tire pressure in accordance with the invention.
Figure 3:
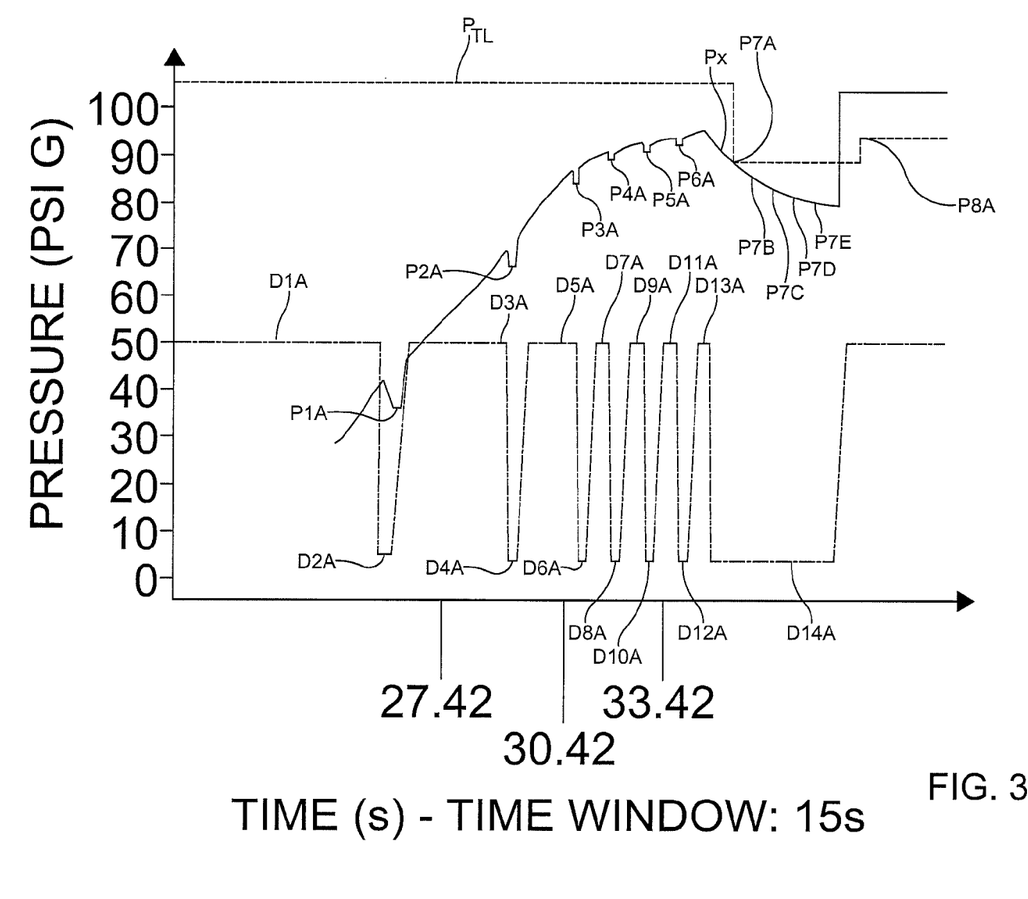
FIG. 3 depicts a graphical view of another embodiment of a method of measuring tire pressure in accordance with the invention.

Embodiments of the method of determining tire pressure can also be described with reference to FIGS. 2 and 3. The embodiments illustrated in FIGS. 2 and 3 will be described below with reference to the pressure of the air in a fluid control circuit over time. The fluid control circuit is configured as illustrated in FIG. 1 and described above and the pressure in the fluid control circuit was measured as described above. The pressure of air in the fluid control circuit was measured over time utilizing a pressure sensor as described above. In FIGS. 2 and 3, the pressure(s) are illustrated in psig and the time(s) are illustrated in seconds. The embodiments illustrated in FIGS. 2 and 3 are exemplary. Thus, the pressure(s) and time(s) shown in FIGS. 2 and 3 may vary between embodiments of the method.

FIG. 2 illustrates an embodiment of the method where it is determined that the fluid control circuit does not have a leak. In this embodiment, a target tire pressure $P_T$ was selected to be 105 psig and programmed into the control unit. Referring now to FIG. 2, at time 15.42 until the beginning of period of time D1, the pressure of the air in the fluid control circuit is measured and is approximately atmospheric pressure. At the beginning of the period of time D1, the pressure of the air supply was measured as described above. The air supply is configured as illustrated in FIG. 1 and described above.

At just before time 18.42, the air supply was placed into fluid communication with the fluid control circuit via a control unit to provide a first pulse of air thereto as described above. The control unit is configured as illustrated in FIG. 1 and described above. At this time, the pressure measured by the pressure sensor dropped suddenly due to the volumetric differences between the first fluid conduit of the control unit and the fluid control circuit. However, at about time 18.42, the pressure begins to rise in a constant manner for the remainder of the period of time D1. As indicated by the rate at which the pressure rises over the remaining duration of D1, the pressure of the air within the fluid control circuit is well below the tire pressure.

At the beginning of period of time D2, the supply valve assembly was placed in a closed position. It should be noted that the bleed air is still provided from the air supply and directed to the fluid control circuit via the control unit and control valve assembly during D2, D4, D6, D8, D10 and D12 as described above. During the period of time D2, the pressure of the air in the fluid control circuit settled as described above and was measured and recorded as P1. The pressure P1 and the target tire pressure were utilized to calculate the duration of a second pulse of air provided during period of time D3. In other embodiments (not depicted) of the method it may be desirable to have a pressure in the fluid control circuit which is higher than the pressure P1 shown in FIG. 2. In these embodiments, the pressure in the fluid control circuit that would be measured and recorded as P1 can be increased by increasing the duration of period of time D1 and the first pulse of air.

At the beginning of period of time D3, the air supply is placed into fluid communication with the fluid control circuit via the control unit to provide the second pulse of air thereto. Fluid communication between the air supply and the fluid control circuit was established by moving the supply valve assembly from a closed position to an open position. As illustrated, the pressure in the fluid control circuit increased at a constant rate for the remainder the period of time D3. It should also be noted that the duration of the second pulse of air provided during period of time D3 is less than that of the pulse of air provided during period of time D1.

At the beginning of period of time D4, the supply valve assembly was closed as described above for period of time D2. During the period of time D4, the pressure of the air in the fluid control circuit was measured and recorded as P2. The difference between pressure P2 and P1 is compared to a predefined value of 1 psig to determine if the wheel valve is open. If the difference between P2 and P1 is below the predefined value, then it is assumed that the wheel valve is open. If it is determined that the wheel valve is not open, the pressure P1, pressure P2 and the target tire pressure are utilized to calculate the duration of a third pulse of air provided during period of time D5. It should be noted that the length of period of time D2 is equal to that of period of time D4 and that the difference between pressure P2 and P1 was not below the predefined value.

The above-described steps for period of time D3 were repeated during periods of time D5, D7, D9 and D11 to provide third, fourth, fifth and sixth pulses of air with durations which decrease sequentially. As illustrated in FIG. 2, the rate at which the pressure changes (increases) during these periods of time further decreases as the pressure in the fluid control circuit approaches the target tire pressure. Also, as illustrated in FIG. 2, periods of time D5, D7, D9 and D11 are separated by periods of time D6, D8 and D10 and the duration of those periods of time are equal. Further, the above-described steps for period of time D4 were repeated during periods of time D6, D8, and D10 to determine if the wheel valve was open and, as the wheel valve was not open, to calculate the durations of the third, fourth, fifth and sixth pulses of air.

After period of time D11 and during the period of time D12, the pressure of the air in the fluid control circuit was measured to be approximately 105 psig and recorded as P6. The difference between pressure P6 and P5, which was measured and recorded during D10, was compared to the predefined value to determine if the wheel valve was open. As the difference between pressure P6 and P5 was below the predefined value of, in this embodiment, 1 psig, it was determined that the wheel valve is open. Next, the pressure was monitored to determine if a leak existed. If a leak existed, the pressure of the air in the fluid control circuit would have decreased as described above. It should be noted that period of time D12 was preferably longer than period of times D2, D4, D6, D8 and D10 so that, if a leak existed, the pressure could have been measured for a sufficient time such that a decrease in pressure could have been detected. As illustrated in FIG. 2, the pressure of the air in the fluid control circuit during period of time D12 did not decrease. Thus, in this embodiment, it was determined that a leak does not exist in the fluid control circuit. As such, the leakage compensation pressure was calculated to be zero. As described above, the tire pressure is calculated by measuring the pressure of the air in the fluid control circuit and, if it is determined that a leak is present therein, adjusting the pressure measured by a leakage compensation pressure. As it was determined that no leaks existed in the fluid control circuit and the leakage compensation pressure is provided as being equal to zero, the tire pressure is equal to the pressure measured P6 during the period of time D12.

FIG. 3 illustrates an embodiment of the method where it was determined that the fluid control circuit has a leak. In this embodiment, a predefined value of 1 psig was utilized to determine if the wheel valve was open and a target tire pressure was selected to be 105 psig and programmed into the control unit. Also, the last tire pressure calculated $P_{TL}$ is known. Referring now to FIG. 3, during of period of time D1A, the fluid control circuit is in fluid communication with the air supply and a pulse of air was provided thereto. At this time, the pressure increased in a constant manner for the remainder of the period of time D1A. As indicated by the rate at which the pressure increased over the remaining duration of D1A, the pressure of the air within the fluid control circuit was well below the tire pressure. It should also be noted that although it is not illustrated in FIG. 3, the pressure of the air supply was measured during period of time D1A as described above and for the embodiment illustrated in FIG. 2.

At the beginning of period of time D2A, the supply valve assembly was closed as described above and for D2 in the embodiment illustrated in FIG. 2. During the period of time D2A, the pressure of the air in the fluid control circuit settled and was measured and recorded as P1A. The pressure P1A and the target tire pressure were utilized to calculate the duration of a second pulse of air which was provided during period of time D3A as described above and for D3 in the embodiment illustrated in FIG. 2.

Additional pulses of air were provided as described above during periods of time D5A, D7A, D9A, D11A and D13A and the pressure of the air in the fluid control circuit settles, was measured and recorded as described above during periods of time D4A, D6A, D8A and D10A. It should be also be noted that bleed air was provided from the air supply and directed to the fluid control circuit via the control unit and control valve assembly as described above during periods of time D2A, D4A, D6A, D8A, D10A, D12A and D14A.

After period of time D11A and during the period of time D12A, the pressure of the air in the fluid control circuit was measured and recorded as P6A. After period of time D13A and during the period of time D14A, the pressure of the air in the fluid control circuit was measured and recorded as Px. The difference between pressure Px and P6A was compared to the predefined value to determine if the wheel valve was open. As the difference between pressure Px and P6A was below the predefined value of 1 psig, it was determined that the wheel valve was open. Once it was determined that the wheel valve was open and Px is below the target tire pressure, the pressure of the air in the fluid control unit was allowed to settle for a predetermined period of time and was measured and recorded as P7A. The pressure measured and recorded as P7A is the measured tire pressure and was then utilized in calculating the tire pressure. In the embodiment illustrated in FIG. 3, the predetermined period of time utilized to measure pressure P7A in the fluid control circuit is about 3× greater than the period of time utilized to capture the measured pressure Px.

Next, the pressure of the air in the fluid control circuit was measured to determine if a leak existed therein. As noted above, if a leak is present, the pressure of the air in the fluid control circuit will decrease as described above. As illustrated in FIG. 3, the period of time D14A was longer than the period of times D2A, D4A, D6A, D8A, D10A and D12A. The period of time D14A was of a duration which allowed the air to settle and the pressures Px and P7A to be measured. Also, the period of time D14A was of a duration which allowed the pressure of the air in the fluid control circuit to be measured at equal increments of time beginning from the time that the pressure was measured as Px and during the remaining portion of period of time D14A so that pressures P7B, P7C, P7D and P7E could also be measured and it could be determined that a leak existed in the fluid control circuit. It should be appreciated that the duration of the period of time D14A could be greater than as shown in FIG. 3 so that additional pressure measurements can be taken after the pressure P7E is measured in order to determine if a leak exists in the fluid control circuit. As shown in FIG. 3, a continuous decrease in pressure from the time the pressure was measured as P7A through the time the pressure of the air in the fluid control circuit was measured as P7E was detected over a predetermined period of time. Preferably, the predetermined period of time utilized to determine that a leak is present in the fluid control circuit is greater than the period of time utilized to measure the pressure of the air in the fluid control circuit that is utilized to calculate the tire pressure. In the embodiment illustrated in FIG. 3, the predetermined period of time utilized to determine that a leak is present in the fluid control circuit is equal to 5× greater than the period of time utilized to measure the pressure Px. As the pressure dropped continuously from P7A through P7E in spite of the bleed air being directed into the fluid control circuit, in the embodiment illustrated by FIG. 3, it was determined that a leak is present in the fluid control circuit.

Prior to determining that the leak existed in the fluid control circuit and calculating the tire pressure, the change in pressure (or pressure drop) in the fluid control circuit was measured over the predetermined period of time (from the time that the pressure P7A was measured) utilizing the pressure sensor as noted above. The difference in pressure between the pressure measured and recorded as P7A and a successive second pressure measurement, which was recorded as P7B, was calculated. As noted above, the difference in pressure, i.e. P7A minus P7B or P7A−P7B, is utilized to calculate and provide the leakage compensation pressure. In this embodiment, the difference in pressure, P7A−P7B, was then added to the difference between the aforementioned difference in pressure between P7A and P7B and the difference in pressure between the second pressure measurement, which was recorded as P7B, and a successive third pressure measurement, which was recorded as P7C, to calculate the leakage compensation pressure. Thus, in the example illustrated in FIG. 3, the leakage compensation pressure was calculated according to the formula: P7A−P7B+((P7A−P7B)−(P7B−P7C)). Also, as illustrated in FIG. 3, the pressure of the air supply was re-measured prior to calculating the tire pressure to ensure that a drop in the pressure of the air provided by the air supply did not result in an inaccurate leakage compensation pressure. Once the leakage compensation pressure was calculated and the air supply was re-measured, the tire pressure P8A was calculated by adding the leakage compensation pressure and the pressured measured P7A together.

Once calculated, the tire pressure P8A can be compared with a target tire pressure. As the tire pressure P8A was determined to be less than the target tire pressure of 105 psig, the tire pressure can be increased. However, if the tire pressure is determined to be greater than the target tire pressure, the tire pressure can be decreased. Alternatively, if the tire pressure would have been determined to equal or about equal to the target tire pressure, then increasing or decreasing tire pressure may not be desired and the method described herein can be repeated, for example, after a predetermined period of time. Also, it should be appreciated that the method can be utilized while increasing the tire pressure or decreasing the tire pressure.

After the tire pressure has been determined, increased, or decreased, the pressure of the air in the fluid control circuit can be vented to the atmosphere.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A method of determining tire pressure, comprising:
providing a control unit which comprises a pressure sensor, wherein the control unit is in fluid communication with a wheel valve via a fluid control circuit;
measuring a pressure of air in the fluid control circuit utilizing the pressure sensor;
determining whether a leak is present in a fluid control circuit and providing a leakage compensation pressure; and
calculating a tire pressure by adding the pressure of the air in the fluid control circuit and the leakage compensation pressure together.

2. The method of claim 1, wherein the wheel valve is a check valve.

3. The method of claim 1, wherein the control unit further comprises a first fluid conduit and the first fluid conduit is in fluid communication with the pressure sensor and the fluid control circuit to enable the pressure sensor to measure the pressure of the air in the fluid control circuit.

4. The method of claim 1, wherein the tire pressure calculated is equal to the pressure of the air in the fluid control circuit if it is determined that a leak is not present in the fluid control circuit.

5. The method of claim 1, further comprising measuring a pressure of air from an air supply.

6. The method of claim 1, further comprising introducing air from an air supply into the fluid control circuit via two or more pulses.

7. The method of claim 1, wherein the pressure of the air in the fluid control circuit is measured over a predetermined period of time.

8. The method of claim 1, further comprising determining if the calculated tire pressure is less than the target tire pressure and, if the calculated tire pressure is less than the target tire pressure, increasing a pressure of air within a tire.

9. The method of claim 1, further comprising measuring the pressure of the air in the fluid control circuit over a predetermined period of time to detect a decrease in the pressure of the air in the fluid control circuit in order to determine if a leak is present in the fluid control circuit.

10. The method of claim 1, further comprising providing a bleed of air from the air supply and directing the bleed of air to the fluid control circuit via the control unit.

11. The method of claim 1, wherein measuring the pressure of the air in the fluid control circuit provides a measured tire pressure.

12. The method of claim 1, further comprising determining a rate by which the pressure in the fluid control circuit decreases to provide the leakage compensation pressure.

13. The method of claim 5, further comprising determining if the air supply is a source of air leakage from the fluid control circuit.

14. The method of claim 5, further comprising determining if the pressure of the air from the air supply is equal to or greater than a target tire pressure.

15. A method of determining tire pressure, comprising:
providing a control unit which comprises a pressure sensor, wherein the control unit is in fluid communication with a check valve via a fluid control circuit;
providing an air supply in fluid communication with the control unit and introducing air from the air supply into the fluid control circuit via two or more pulses;
measuring a pressure of the air in the fluid control circuit utilizing the pressure sensor;
determining whether a leak is present in a fluid control circuit by measuring the pressure of the air in the fluid control circuit over a predetermined period of time in order to detect a decrease in the pressure;
determining a rate by which the pressure of the air in the fluid control circuit decreases to provide a leakage compensation pressure; and
calculating a tire pressure by adding the pressure of the air in the fluid control circuit and the leakage compensation pressure together.

16. The method of claim 15, wherein each pulse is of a duration which decreases as the pressure of the air in the fluid control circuit approaches a target tire pressure.

17. The method of claim 15, further comprising measuring a pressure of the air from the air supply.

* * * * *